May 21, 1963 H. P. WOLFF 3,090,923

LOGIC SYSTEM, USING WAVES DISTINGUISHABLE AS TO FREQUENCY

Filed Feb. 17, 1958 4 Sheets-Sheet 1

LOGIC SYSTEM, USING WAVES DISTINGUISHABLE AS TO FREQUENCY

Filed Feb. 17, 1958 4 Sheets-Sheet 3

LOGIC SYSTEM, USING WAVES DISTINGUISHABLE AS TO FREQUENCY

Filed Feb. 17, 1958 4 Sheets-Sheet 4

United States Patent Office 3,090,923

Patented May 21, 1963

3,090,923

LOGIC SYSTEM, USING WAVES DISTINGUISHABLE AS TO FREQUENCY

Hermann P. Wolff, Millbrook, N.Y., assignor to International Business Machines Corporation, New York, N.Y., a corporation of New York Filed Feb. 17, 1958, Ser. No. 715,739
10 Claims. (Cl. 328—93)

This invention relates to systems for performing logical operations and more particularly to computing systems, or other information-handling systems, in which waves distinguishable on a frequency basis are employed.

In accordance with the invention, modulators or mixers are employed to alter the frequency of a wave, and filters are employed to pass or reject waves of a particular frequency, whereby necessary switching is effected to carry out various desired logical operations.

A feature of the invention is that alternating waves may be employed throughout the system without necessity at any point of converting alternating waves into direct current pulses or vice versa.

Another feature is that elementary unit circuits may be designed in accordance with the invention, which circuits may be used as building blocks for constructing logical systems of any desired degree of complexity, the various units all being capable of working together in any desired combination. For example, in a system of binary logic, one such unit will be designed to give an output digit zero when two input digits, both zeros, are applied as inputs. Preferably, a digit "one" in either the input or the output of the system is always represented by one particular frequency, e.g., frequency $f_1$, and a digit "zero" always by another frequency, $f_0$. Thus, in the unit just described, inputs of $f_0$ and $f_0$ respectively produce an output of $f_0$. Examples of other units are inputs $f_0$, $f_1$, to produce output $f_1$; inputs $f_1$, $f_1$, to produce output $f_0$, etc. From these and other such units there may be built up complex logic or computing systems, for example, a binary adder, as for use in a digital computer.

Another feature of the invention is that considerable variation in amplitude of the waves may be tolerated without affecting the accuracy of the system.

Other features, objects and advantages will appear from the following more detailed description of an illustrative embodiment of the invention, which will now be given in conjunction with the accompanying drawings.

Figures 1, 2, 3, 4:
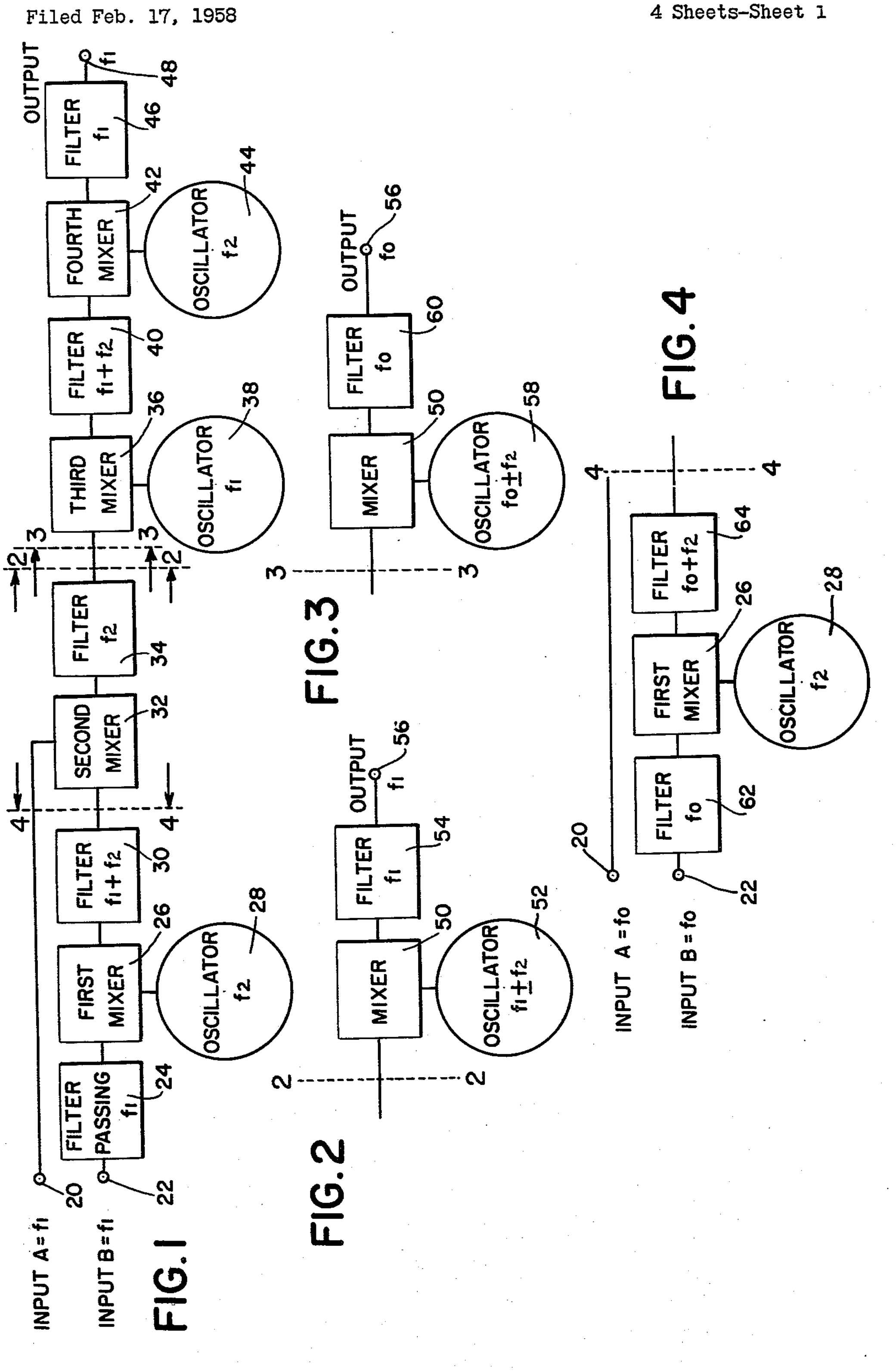
FIG. 1 is a block schematic diagram of a logical AND circuit in accordance with the invention.
FIG. 2 shows a modification of the portion of the system of FIG. 1 to the right of the line 2—2.
FIG. 3 shows a modification of the portion of the system of FIG. 1 to the right of the line 3—3 whereby the output frequency of the system of FIG. 1 may be made different from that indicated in FIG. 1.
FIG. 4 shows a modification of the portion of the system of FIG. 1 to the left of the line 4—4 whereby the input frequency used with the system may be different from that indicated in FIG. 1.

Referring to FIG. 1, there is disclosed therein an AND circuit for inputs A and B of frequency $f_1$ so designed as to give an output of the same frequency $f_1$ or of any other desired frequency. Input waves A and B are impressed upon the system of FIG. 1 at input terminals 20 and 22 respectively. Terminal 22 is connected through a filter 24 which is a band pass filter passing the frequency $f_1$, to a first mixer or modulator 26. In the mixer 26 a wave of frequency $f_1$, if present, is modulated with a wave of any desired frequency $f_2$ from a local oscillator 28. From the output of modulation products in the mixer, the frequency $f_1+f_2$ is selected in a filter 30. Instead of the frequency $f_1+f_2$ the frequency $f_1-f_2$ may be selected, or any modulation product frequency which depends upon both the frequency of the input wave B and the frequency of the local oscillator 28.

The output of the filter 30 together with the input wave A from terminal 20 is impressed upon a second mixer 32 and from the modulation products formed in the mixer 32 the frequency $f_2$, if present, is selected by means of a filter 34.

In the operation of the system of FIG. 1 up to this point, input waves A and B each of approximately the frequency $f_1$ are required if there is to be an output wave from filter 34. If input wave B departs from frequency $f_1$ materially the wave will not pass filter 24 with the result that there will be no wave of frequency $f_1+f_2$ from mixer 26 and no wave of frequency $f_2$ produced in mixer 32. If input wave A departs from frequency $f_1$ materially the output of mixer 32 will not be of frequency $f_2$ and so will not pass filter 34. Thus the system produces an output wave if and only if input waves A and B are both of frequency $f_1$ and therefore the system is an AND circuit for waves of frequency $f_1$.

In order to make all logic circuits compatible and interchangeable, it is advisable to design all the circuits to have the same output frequencies for representing a digit one and a digit zero respectively. It is also desirable to have an input digit one and an output digit one represented by one and the same frequency, and an input digit zero and an output digit zero both represented by a second frequency. For these purposes, the circuit elements shown to the right of line 2—2 in FIG. 1 may be employed. In this portion of the circuit, a third mixer 36 receives the output from the filter 34 together with a wave of the frequency $f_1$ from a local oscillator 38, producing an output component of frequency $f_1+f_2$ which passes through a filter 40 into a fourth mixer 42. The mixer 42 combines the output wave of frequency $f_1+f_2$ from filter 40 with a wave of frequency $f_2$ from a local oscillator 44 to produce a component of frequency $f_1$ which is selected by a filter 46 and made available at an out-terminal 48. The portion of the circuit to the right of line 2—2 thus functions to convert from frequency $f_2$ to frequency $f_1$. The complete system of FIG. 1 therefore gives an output of frequency $f_1$, if and only if inputs A and B are both of frequency $f_1$.

Oscillators, mixers and filters suitable for use in the apparatus described herein are, per se, known, illustrative forms being described, for example, in Radio Engineers Handbook, by F. E. Terman, 1943, pages 569–570 and 170–172; also Radiation Laboratory Series (McGraw-Hill), volume 1, copyright 1947, pages 411–418; and volume 9, copyright 1948, pages 686–691.

FIG. 2 shows an alternative arrangement for converting from frequency $f_2$ to frequency $f_1$, and may be substituted in FIG. 1 for the portion of the system to the right of line 2—2. In the circuit of FIG. 2, a single mixer 50 receives a wave of frequency $f_2$ from the output of filter 34 and combines it with a wave of frequency $f_1 \pm f_2$ from a local oscillator 52 to produce immediately a component of frequency $f_1$ which is selected by a filter 54 and made available at an output terminal 56.

FIG. 3 shows how the frequency conversion may be from $f_2$ to the frequency $f_0$ by using $f_0$ instead of $f_1$ wherever the frequency $f_1$ apears in FIG. 2. This means replacing local oscillator 52 by a local oscillator 58 supplying frequency $f_0 \pm f_2$ and replacing filter 54 by a filter 60 which selects the frequency $f_0$. The arrangement of FIG. 3 may be substituted in FIG. 1 for the portion of the system to the right of line 3—3.

FIG. 4 shows how the system of FIG. 1 may be converted into one which requires the simultaneous presence of input waves A and B both of the frequency $f_0$ in order to produce an output, in which case the output will be of the frequency $f_1$. FIG. 4 shows an arrangement which is to be substituted in FIG. 1 for the portion of the system of FIG. 1 to the left of line 4—4. In the circuit of FIG. 4, the filter 24 is replaced by a filter 62 which selects the frequency $f_0$. The output of the mixer 26 contains a component of frequency $f_0+f_2$ which is selected by a filter 64 which replaces the filter 30. With the arrangement of FIG. 4 substituted in the system of FIG. 1, a wave of frequency $f_0$ from input terminal 20 is combined with a wave of frequency $f_0 \pm f_2$ by means of mixer 32 to produce a component of frequency $f_2$ which is then converted into a wave of frequency $f_1$ as described hereinabove in connection with the operation of FIG. 1.

By substituting both FIG. 4 and FIG. 3 in FIG. 1 simultaneously, an arrangement is obtained wherein the presence of frequency $f_0$ at both inputs is required in order that an output may be produced and the output when produced is a wave of frequency $f_0$.

Figure 5:
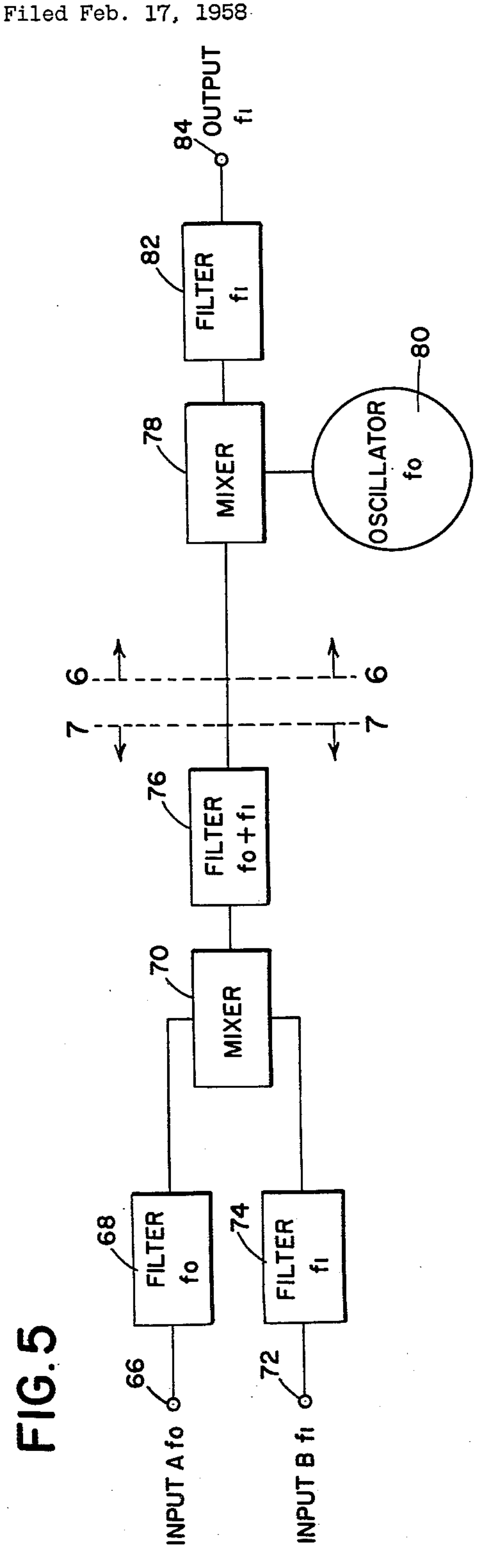
FIG. 5 is a block schematic diagram of another type of a logical circuit in accordance with the invention.
Figure 6:
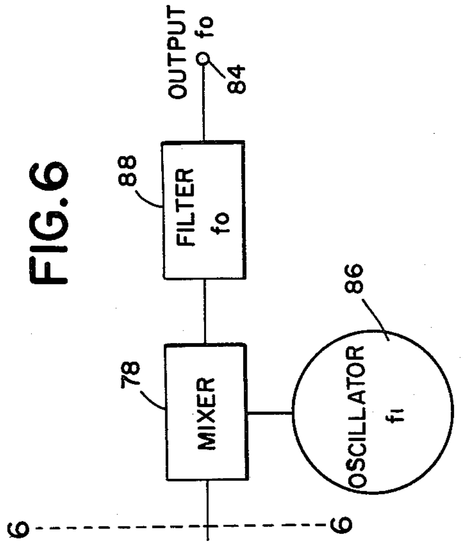
FIG. 6 shows a modification of the portion of the system of FIG. 5 to the right of the line 6—6 whereby the output frequency of the system of FIG. 5 may be made different from that indicated in FIG. 5.
Figure 7:
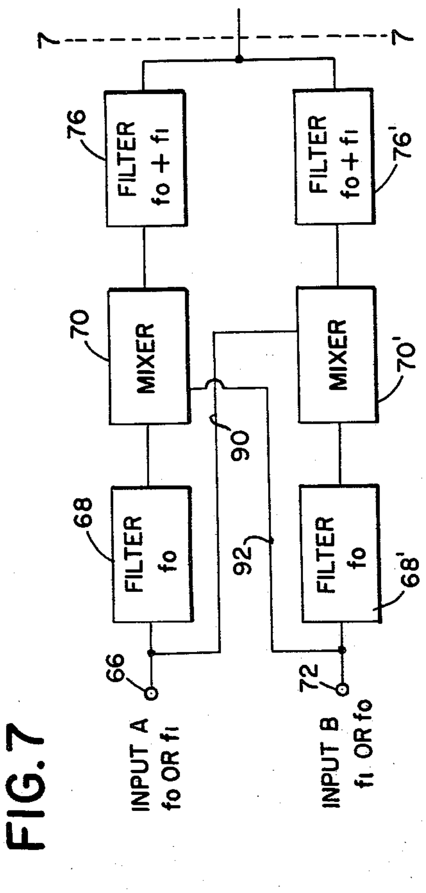
FIG. 7 shows a modification of the portion of the system of FIG. 5 to the left of line 7—7.

FIGS. 5, 6 and 7 relate to logic systems which require one input at frequency $f_1$ and another input at frequency $f_0$ in order to produce an output wave, which output wave may be arranged for either frequency $f_1$ or $f_0$, as desired.

Referring to FIG. 5, an input terminal 66 is connected to a filter 68 to pass the frequency $f_0$ to a mixer 70. Another input terminal 72 is connected to a filter 74 to pass the frequency $f_1$ to the mixer 70. In the output of the mixer a component of frequency $f_0+f_1$ is selected by a filter 76. The output of the filter 76 is impressed upon a mixer 78 together with a wave of frequency $f_0$ from a local oscillator 80, producing a component of frequency $f_1$ which is selected by a filter 82 and transmitted to an output terminal 84. An output wave of frequency $f_1$ is produced at the output of the system of FIG. 5 if and only if an input wave A of frequency $f_0$ is impressed upon input terminal 66 and an input wave B of frequency $f_1$ is impressed upon input terminal 72. Otherwise impressed waves of frequencies $f_1$ or $f_0$ produce no output wave at terminal 84. The system of FIG. 5 may be arranged to respond only to an input wave A of frequency $f_1$ together with an input wave B of frequency $f_0$ by impressing input A at terminal 72 and input B at terminal 66 instead of vice versa as indicated in FIG. 5.

FIG. 6 shows how the system to the right of line 6—6 in FIG. 5 may be altered to make the system produce output at the frequency $f_0$. An oscillator 86 of frequency $f_1$ replaces the oscillator 80 and a filter 88 selective to frequency $f_0$ replaces filter 82.

The various cases involved in the combinations of input frequencies and output frequencies for which provision is made in the systems shown in FIGS. 1 through 6 are summarized in Table 1.

*Table 1*

| Case | Input A | Input B | Output | Figures |
|---|---|---|---|---|
| *a* | $f_0$ | $f_0$ | $f_0$ | 4–1–3. |
| *b* | $f_0$ | $f_0$ | $f_1$ | 4–1. |
| *c* | $f_0$ | $f_1$ | $f_0$ | 5–6. |
| *d* | $f_0$ | $f_1$ | $f_1$ | 5. |
| *e* | $f_1$ | $f_0$ | $f_0$ | 5, modified; —6. |
| *f* | $f_1$ | $f_0$ | $f_1$ | 5, modified. |
| *g* | $f_1$ | $f_1$ | $f_0$ | 1–3. |
| *h* | $f_1$ | $f_1$ | $f_1$ | 1. |

FIG. 7 shows how the cases (*d*) and (*f*) of Table 1 may be combined to form a single system which will respond with an output frequency $f_1$ if and only if either one of the input waves is of frequency $f_0$ and the other input wave is of frequency $f_1$. Also, FIGS. 6 and 7 may be combined along line 6—6 to produce a system which will respond with the output frequency $f_0$ in accordance with cases (*c*) and (*e*) of Table 1.

In FIG. 7, filter 68, mixer 70 and filter 76 are connected as in FIG. 5 and duplicate elements 68', 70', 76' are provided in the lower branch circuit, the terminal 72 being connected to the duplicate filter 68'. Cross connections 90, 92 which will pass the frequency $f_1$ are provided from input terminal 66 to lower mixer 70' and from input terminal 72 to upper mixer 70. In the operation of the system of FIG. 7, an input wave of frequency $f_0$ on either of the input terminals will pass through one of the filters 68 or 68' to the adjacent mixer 70 or 70'. An input wave of frequency $f_1$ on the other input terminal will be impressed upon the same mixer with the wave of frequency $f_0$ by way of one of the cross connections 90, 92. As a result a component of frequency $f_0+f_1$ will appear in the output of the mixer and be selected by the adjacent filter 76 or 76' the same as in the system of FIG. 5. The arrangement is a logical EXCLUSIVE OR circuit for either $f_0$ or $f_1$.

Figure 8:
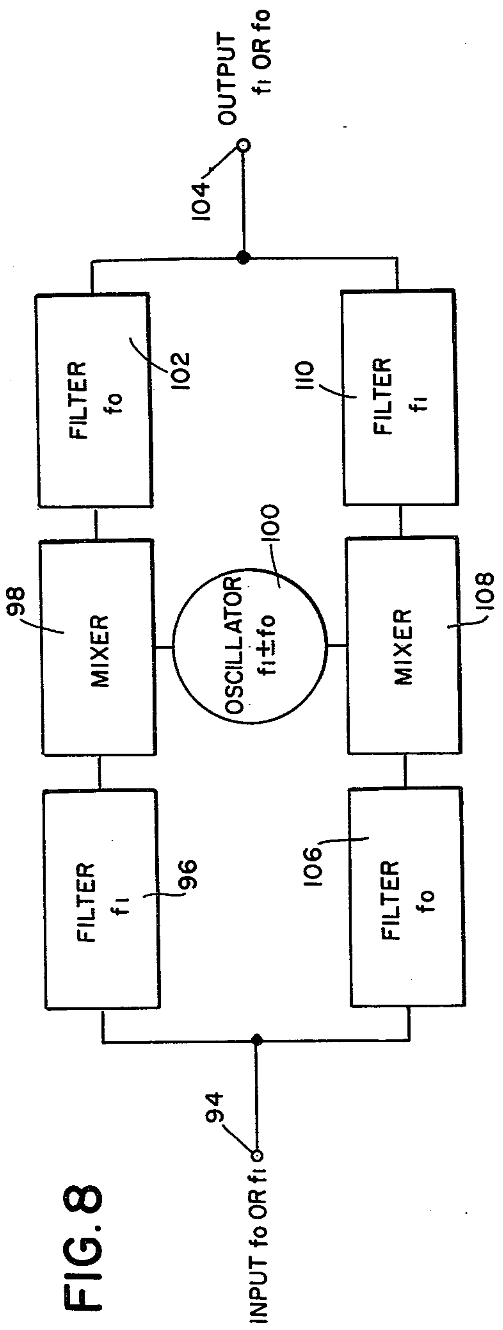
FIG. 8 is a block schematic diagram of a logical inverter embodying the invention.

FIG. 8 shows a system for converting a wave of frequency $f_0$ into a wave of frequency $f_1$, or vice versa. In a binary system of logic in which the digits are represented by waves of frequency $f_0$ and $f_1$ respectively, each digit represents the inverse of the other digit and a system for converting either digit into the other is an inverter and performs the logical operation of inversion.

Referring to FIG. 8, an input terminal 94 is connected to two circuit branches, one branch containing a filter 96 for selecting a wave of frequency $f_1$ and impressing it upon a mixer 98 along with a wave of frequency $f_1 \pm f_0$ from a local oscillator 100. The output of the mixer includes a component of frequency $f_0$ which is selected by a filter 102 and transmitted to an output terminal 104. The other branch of the circuit contains a filter 106 for selecting a wave of frequency $f_0$ and impressing it upon a mixer 108 together with a wave of frequency $f_1 \pm f_0$ from the oscillator 100. The output of the mixer 108 includes a component of frequency $f_1$ which is selected by a filter 110 and impressed upon an output terminal 104.

In the operation of the system of FIG. 8, an input wave of frequency $f_1$ passes through filter 96 and is converted into a wave of frequency $f_0$ in the output of mixer 98. This wave passes through filter 10 to output terminal 104. An input wave of frequency $f_0$, on the other hand, passes through filter 106, is converted into a wave of frequency $f_1$ in mixer 108 and passes to terminal 104 through filter 110.

Figure 9:
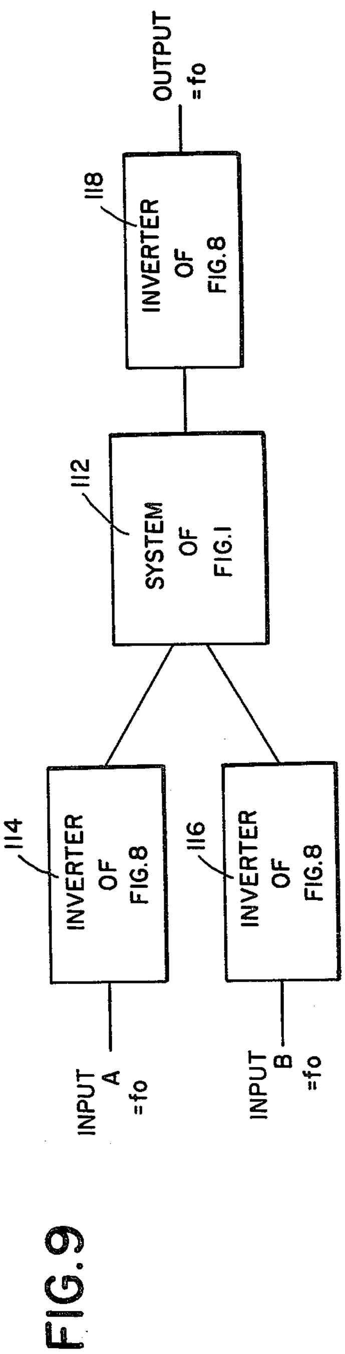
FIG. 9 is a block schematic diagram of a logical circuit comprising the system of FIG. 1 together with a plurality of inverters.

FIG. 9 shows how inverters of the type shown in FIG. 8 may be used to convert the system of FIG. 1 from case (*h*) of Table 1 to case (*a*) of the table. In the system of FIG. 9, the system of FIG. 1 is represented by a block 112. Inputs A and B are impressed upon the input terminals of the system of FIG. 1 through inverters 114 and 116 respectively. The output of the system of FIG. 1 is led through an inverter 118. Waves of frequency $f_0$ impressed upon the inverters appear as waves of frequency $f_1$ at the input of the system 112, producing an output wave of frequency $f_1$ which is converted into a wave of frequency $f_0$ by inverters 118.

Other conversions of one case from Table 1 into another case may be constructed in the manner of the system of FIG. 9 by omitting any one or two of the inverters 114, 116, 118, so as to secure the desired input and output frequencies for the case which it is desired to construct. Similarly it is possible to start with any one of the cases (*a*) through (*h*) and convert it into any other of these cases by using the appropriate number of inverters suitably placed. The use of inverters may at times result in a need for more filters and mixers than if separate systems are used for each case shown in Table 1, but may be an advantage in that the number of different systems which are needed to build up any desired case may be reduced to one logic circuit and the inverter.

Figure 10:
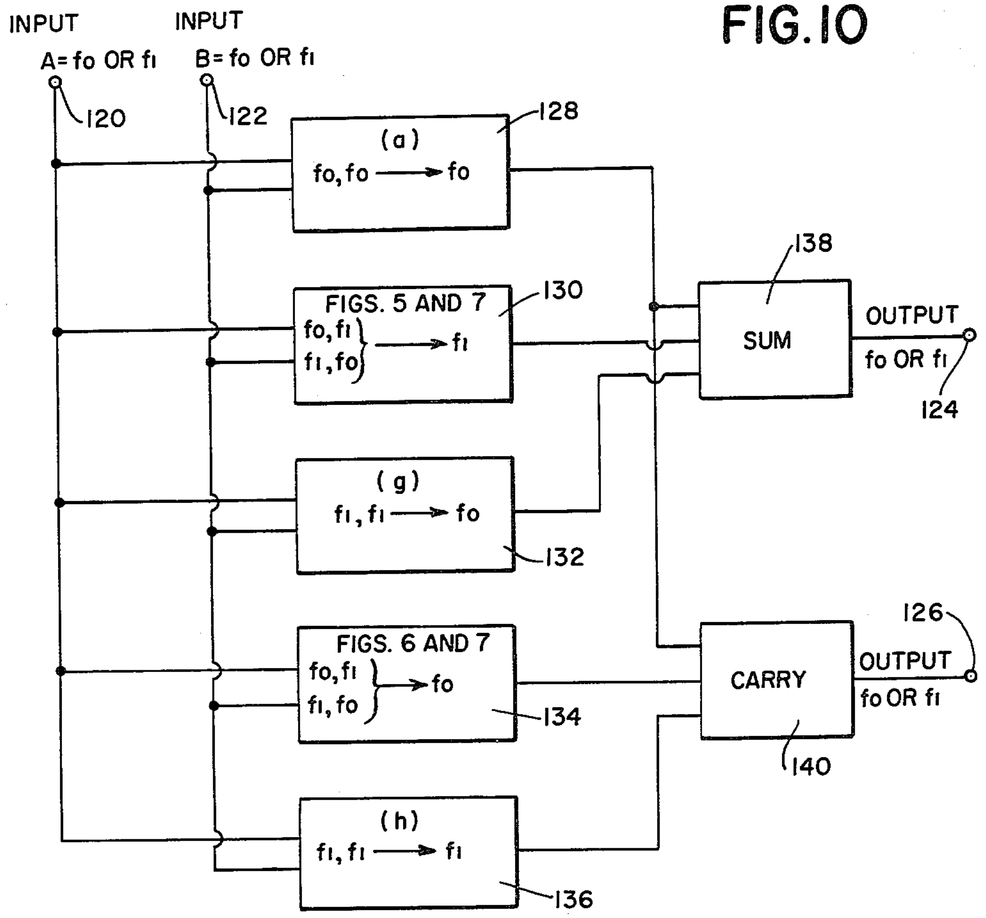
FIG. 10 is a block schematic diagram of a binary half adder embodying the invention.

FIG. 10 shows a binary half adder employing in combination a plurality of logic circuits of the types hereinabove described. Inputs A and B are waves of frequency either $f_0$ representing a binary digit zero or $f_1$ representing a binary digit one. Inputs A and B are impressed upon input terminals 120 and 122 respectively. Output waves representing the binary sum and binary carry respectively are produced at output terminals 124 and 126. A binary digit zero in the output is represented by a wave of the frequency $f_0$ and a binary digit one by a wave of the frequency $f_1$.

Table 2 shows the analysis of the process of binary addition in terms of the unit logical operations listed in Table 1. For each of the four combinations of digits zero and one to be added, the sum and carry are shown in Table 2 together with the pertinent case from Table 1.

*Table 2*

| Input A | Input B | Sum | | Carry | |
|---|---|---|---|---|---|
| | | Digit | Case | Digit | Case |
| 0 | 0 | 0 | *a* | 0 | *a* |
| 0 | 1 | 1 | *d* | 0 | *e* |
| 1 | 0 | 1 | *f* | 0 | *e* |
| 1 | 1 | 0 | *g* | 1 | *h* |

According to Table 2, seven of the logic units listed in Table 1 are needed to produce both sum and carry for all cases. However, it has been shown hereinabove that cases (*d*) and (*f*) may be combined in a single circuit comprising the system of FIG. 7 and the portion of the system of FIG. 5 to the right of line 7—7 to give an output at frequency $f_1$ whenever one input is at frequency $f_0$ and the other at frequency $f_1$. By using the combined circuit the number of logic units required is reduced to five as shown in FIG. 10.

In FIG. 10, the logic unit 128 functions according to case (*a*) of Table 1 to produce an output at $f_0$ when both inputs A and B are at $f_0$, as required by Table 2 both for the sum of 0+0 which is zero and for the zero carry which results from the sum of 0+0. Unit 130 produces an output at $f_1$ whenever one input is at frequency $f_0$ and the other input is at frequency $f_1$, as required by Table 2 for the sum of either 0+1 or 1+0. Unit 132 functions according to case (*g*) of Table 1 to produce an output at $f_0$ when both inputs are at $f_1$, as required by Table 2 for the sum of 1+1.

To complete the computation of the carry for all cases, there are provided in addition to unit 128, the units 134 and 136. Unit 134 produces an output at $f_0$ whenever one input is at $f_0$ and the other at $f_1$ as required by Table 2 for the zero carry resulting from either 0+1 or 1+0. Unit 136 functions according to case (*h*) of Table 1 to produce an output at $f_1$ whenever both inputs are at $f_1$, as required by Table 2 for the carry of one which results from the sum of 1+1.

In FIG. 10, the input terminals 120 and 122 are each connected in parallel to one input terminal of each of the units 128, 130, 132, 134, 136. The output terminals of the units 128, 130 and 132 are connected to a combining circuit 138 which is in turn connected to the output terminal 124 for the sum. The circuit 138 may be of any suitable type which has the property of coupling each of the logic units 128, 130, 132 to the terminal 124 while at the same time substantially preventing interaction between any two of the logic units. The output terminals of the logic units 128, 134 and 136 are connected through a combining circuit 140 with properties similar to those of the circuit 138 to the output terminal 126 for the carry. Combining circuits suitable for such use, as at 140 and 138, are per se, known, being shown, for example, in H. O. Peterson Patent 2,298,409 FIG. 3 granted October 13, 1942.

In the operation of the system of FIG. 10, when a wave of frequency $f_0$ is impressed upon input terminal 120 at the same time that a wave of frequency $f_0$ is impressed upon input terminal 122 an output wave of frequency $f_0$ is produced both at output terminal 124 and at output terminal 126 by the action of unit 128. None of the other logic units produces any output under this input condition. When input A is at $f_0$ and input B is at $f_1$ and also when input A is at $f_1$ and input B is at $f_0$ an output wave at $f_1$ is produced at terminal 124 by the action of unit 130 and an output wave at $f_0$ is produced at terminal 126 by the action of unit 134. When a wave at $f_1$ is impressed at input terminal 120 at the same time that a wave at $f_1$ is impressed at input terminal 122, an output wave at $f_0$ is produced at terminal 124 by the action of unit 132 and an output wave at $f_1$ is produced at terminal 126 by the action of unit 136. Except as hereinabove noted no outputs are produced by the logic units. Accordingly, the system of FIG. 10 carries out the function of binary addition with indication of the necessary carry digit for any combination of two binary digits.

The system of FIG. 10 gives a material output wave in each of the four input cases, for the sum digit and for the carry digit, that is, the absence of an output wave is not relied upon to give an indication of a digit. However, should it be regarded sufficient to indicate a digit one by a wave of frequency, say $f_1$, and a digit zero by the absence of an output wave, the logic units 128, 132, and 134 may be omitted in the system of FIG. 10, leaving only unit 130 to indicate the sum digit and unit 136 to indicate the carry digit. Consideration of Table 2 shows that the sum digit is found by the logical operation of EXCLUSIVE OR and the carry digit is found by the logical operation AND. Expressed in logical terms these results may be given by the following equations:

$$\text{Sum}=(A+B)(\overline{AB}) \qquad (1)$$

$$\text{Carry}=AB \qquad (2)$$

Equation 1 means that the sum digit is one only when either A or B is one, but not both A and B. Equation 2 means that the carry is one only when A and B are both one.

Figure 11:
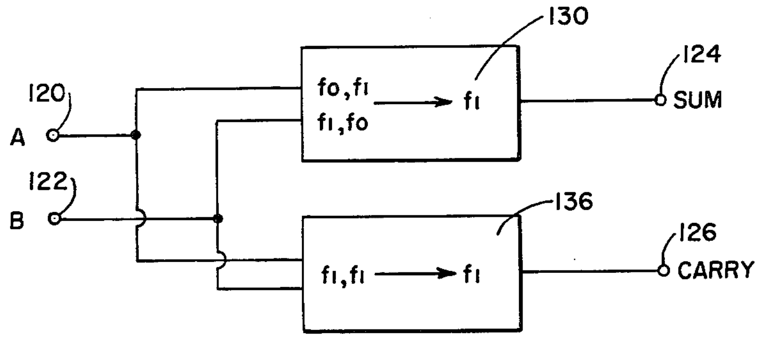
FIG. 11 is a block schematic diagram showing a modified form of binary half adder.

FIG. 11 shows the above-described modification of the system of FIG. 10. In the system of FIG. 11 the combining circuits 138, 140 are not needed, the output of unit 130 being connected directly to output terminal 124 and the unit 136 being connected directly to output terminal 126.

It will be evident that in all the embodiments shown the inputs A and B may be the outputs of other logical units which are of course immediately usable without conversion of any kind and that the output of any logic unit is immediately usable as an input to another logic unit.

It will also be evident that numerous modulation products represented by waves of various frequencies appear in the mixer output and that any modulation product which is dependent upon both inputs to the mixer may be used as the output wave from the mixer and may be selected by the filter following the mixer. Also the particular frequency assigned to the local oscillator may be changed as desired except in those instances where the desired frequency of output from the mixer determines the frequency required of the local oscillator.

It will be understood that the invention is not limited to binary operations but may readily be extended to operations involving three or more digits by using three or more frequencies to represent the digits. For example, in operations in the decimal system, ten frequencies may be employed to represent the digits 0 through 9.

It will also be understood that the invention is not limited to combining only two digits or inputs in a given logical operation. For example, two digits to be added may be combined with a carry digit from a previous operation as in a full binary adder to obtain a sum digit and a carry digit to be carried to a subsequent operation.

While an illustrative form of apparatus and a method in accordance with the invention have been described and shown herein, it will be understood that numerous changes may be made without departing from the general principles and scope of the invention.

I claim:

1. In a binary adding system in which waves of frequency $f_0$ represent a binary digit zero and waves of frequency $f_1$ represent a binary digit one, a first logic unit circuit which responds to two input waves each of frequency $f_0$ to give an output frequency $f_0$, a second logic unit circuit which responds to two input waves one of frequency $f_0$ and the other of frequency $f_1$ to give an output frequency $f_1$, a third logic unit circuit which responds to two input waves each of frequency $f_1$ to give an output frequency $f_0$, a fourth logic unit circuit which responds to two input waves one of frequency $f_0$ and the other of frequency $f_1$ to give an output frequency $f_0$, a fifth logic unit circuit which responds to two input waves each of frequency $f_1$ to give an output frequency $f_1$, said logic circuits being connected with their inputs in parallel relationship to each other and arranged to receive input waves in any combination of said frequencies $f_0$ and $f_1$, an output circuit for sum digits connected to the said first, second and third logic unit circuits, and an output circuit for carry digits connected to the said first, fourth and fifth logic unit circuits.

2. In a logic system in which waves distinguishable as to frequency represent various digits, first and second input terminals for digit representing waves, a first filter for passing a frequency $f_1$ connected to one of said input terminals, a first mixer connected to the output of said filter, a local oscillator of a frequency $f_2$ for said first mixer, to produce sum and difference frequency components in the output of said mixer, a second filter for selecting one of said sum and difference frequency components connected to the output of the first mixer, a second mixer, the other of said input terminals being connected to the said second mixer together with the output from said second filter, and a filter in the output of the second mixer for selecting a wave component of frequency $f_2$, whereby input waves of frequency $f_1$ at both input terminals simultaneously are necessary in order to produce an output wave of frequency $f_2$.

3. Apparatus according to claim 2, together with means to convert an output wave of frequency $f_2$ to a wave of a frequency representing a digit.

4. In a logic system in which waves distinguishable as to frequency represent various digits, an inverter for converting a wave of frequency $f_1$ into a wave of frequency $f_0$ or vice versa, said inverter comprising a pair of input filters for passing frequency $f_1$ and frequency $f_0$ respectively, an input terminal connected in parallel with said filters, a pair of output filters for passing frequency $f_1$ and frequency $f_0$ respectively, an output terminal connected in parallel with said output filters, a first mixer having an input connected to the output of the input filter for frequency $f_1$ and an output connected to the input of the output filter for frequency $f_0$, a second mixer having an input connected to the output of the input filter for frequency $f_0$ and an output connected to the input of the output filter for frequency $f_1$, and a common local oscillator connected to said first and second mixers for applying to each of them a wave differing in frequency from the frequency $f_1$ by the frequency $f_0$.

5. In a logic system in which waves distinguishable as to frequency represent different information, first and second input terminals for information-representing waves, a filter for selecting a wave component of frequency $f_0$ connected to one of said input terminals, a first mixer connected to the output of said filter and also to said second input terminal, a filter for selecting a wave component of frequency $f_0$ connected to the second of said input terminals, a second mixer connected to the output of said last-mentioned filter and also to said first input terminal for producing sum and difference components, and filter means for selecting a wave component of a predetermined one of said sum and difference frequencies connected to the output terminals of said mixers, whereby an input wave of frequency $f_0$ applied to one of said input terminals and an input wave of frequency $f_1$ applied to the other of said input terminals are necessary in order to produce an output wave of a predetermined frequency at the output of said filter means.

6. Apparatus according to claim 5 together with means, connected to the output of said filter means, to convert an output wave of said predetermined frequency to a wave of the frequency of one of said input waves.

7. In an adding system employing waves of different frequencies for representing different digits, in combination, means comprising a plurality of parallel channels, means for applying a plurality of said digit-representing waves simultaneously to each of said channels, each of said channels comprising: frequency-converting means for converting said waves applied to said channel to modulation wave components of frequency different from said digit-representing frequencies, frequency-discriminating means in each of said channels connected to said frequency-converting means, to receive said modulation wave components and to reject some of them but to select at least one of them, whereby the presence of said selected component indicates the presence of input waves representative of a predetermined combination of digits, and additional frequency-converting means connected to said frequency-discriminating means for converting said selected wave components to output waves of digit-representing frequency.

8. A logic system in which different digits are represented by waves of frequencies $f_0$ and $f_1$, respectively, comprising in combination, means responsive to a coincidence of two input waves both of frequency $f_0$ to produce an output wave of frequency $f_0$, means responsive to a coincidence of an input wave of frequency $f_0$ and an input wave of frequency $f_1$ to produce an output wave of frequency $f_1$, means responsive to a coincidence of two input waves both of frequency $f_1$ to produce an output wave of frequency $f_0$, means to impress upon all of said first three mentioned means simultaneously two input waves each of which may have either frequency $f_0$ or frequency $f_1$, and common output means coupled to said first three mentioned means, whereby said output means receives a wave of frequency $f_0$ when either said first or said third mentioned means is actuated and a wave of frequency $f_1$ when said second mentioned means is actuated, said combination of means operating as an adder to provide an output wave representing the sum of said digits.

9. In a logic system in which different items of information are represented by waves of frequencies $f_0$ and $f_1$, respectively, in combination, means responsive to a coincidence of two input waves both of frequency $f_0$ to produce an output wave of frequency $f_0$, means responsive to a coincidence of an input wave of frequency $f_0$ and an input wave of frequency $f_1$ to produce an output wave of frequency $f_0$, means responsive to a coincidence of two input waves both of frequency $f_1$ to produce an output wave of frequency $f_1$, means to impress upon all of said first three mentioned means simultaneously two input waves each of which may have either frequency $f_0$ or frequency $f_1$, and common output means for said first three mentioned means, whereby said output means receives a wave of frequency $f_0$ when either said first or said second mentioned means is actuated and a wave of frequency $f_1$ when said third mentioned means is actuated.

10. In a logic system in which waves distinguishable as to frequency represent various items of information, in combination, a source of waves of frequency $f_0$, a source of waves of frequency $f_1$, a plurality of unit logic circuits, each said logic circuit having at least two inputs and said logic circuits being connected with their respective inputs in parallel relationship to each other, first switching means for representing a first item of information, said first switching means providing a choice between waves of frequency $f_0$ and waves of frequency $f_1$ for connection to a first input to said logic circuits, second switching means for representing a second item of information, said second switching means providing a choice between waves of frequency $f_0$ and waves of frequency $f_1$ for connection to a second input to said logic circuits, each said logic circuit being adapted to produce a predetermined output wave in response to a predetermined choice of input wave frequencies, said choices being mutually exclusive as among the respective logic circuits, and common output means for said logic circuits for receiving a frequency distinguishable wave from any single one of said logic circuits to represent an item of information resulting from a logical operation performed by a single one of said logic circuits.

References Cited in the file of this patent

UNITED STATES PATENTS

| | | |
|---|---|---|
| 2,499,279 | Peterson | Feb. 28, 1950 |
| 2,666,141 | Clapp et al. | Jan. 12, 1954 |
| 2,719,670 | Jacobs et al. | Oct. 4, 1955 |
| 2,756,329 | Lubkin | July 24, 1956 |
| 2,775,712 | MacCallum et al. | Dec. 25, 1956 |
| 2,815,488 | Von Newmann | Dec. 3, 1957 |
| 2,872,646 | Goldstine | Feb. 3, 1959 |
| 2,926,850 | Richards | Mar. 1, 1960 |
| 3,007,643 | Tukey | Nov. 7, 1961 |